US006984451B2

(12) United States Patent
Andre et al.

(10) Patent No.: US 6,984,451 B2
(45) Date of Patent: Jan. 10, 2006

(54) USE OF ACYLATED POLYAMINES FOR THE MODIFICATION OF SURFACES

(75) Inventors: Valerie Andre, Ludwigshafen (DE); Werner Bertleff, Viernheim (DE); Oliver Borzyk, Speyer (DE); Jürgen Huff, Ludwigshafen (DE); Ralf Nörenberg, Buettelborn (DE); Michael Zirnstein, Schriesheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 180 days.

(21) Appl. No.: 10/297,597

(22) PCT Filed: Jun. 13, 2001

(86) PCT No.: PCT/EP01/06720

§ 371 (c)(1),
(2), (4) Date: Dec. 13, 2002

(87) PCT Pub. No.: WO01/96655

PCT Pub. Date: Dec. 20, 2001

(65) Prior Publication Data

US 2004/0018357 A1 Jan. 29, 2004

(30) Foreign Application Priority Data

Jun. 13, 2000 (DE) .................. 100 29 028

(51) Int. Cl.
  *C08F 2/12* (2006.01)
  *B32B 5/16* (2006.01)
(52) U.S. Cl. .............. 428/407; 427/444; 427/445; 428/327; 522/174; 522/182; 510/490
(58) Field of Classification Search ........... 428/327, 428/364, 365, 407, 704; 427/444, 445; 522/174, 522/182; 510/490
See application file for complete search history.

(56) References Cited

U.S. PATENT DOCUMENTS

| 3,597,265 | A |   | 8/1971  | Mecklenborg et al. |
|-----------|---|---|---------|--------------------|
| 3,865,813 | A | * | 2/1975  | Gergel ........................ 540/460 |
| 3,940,340 | A | * | 2/1976  | Bucking et al. ............ 510/307 |
| 4,201,680 | A | * | 5/1980  | Waltenberger et al. .... 252/8.81 |
| 4,540,747 | A |   | 9/1985  | Saegusa et al. |
| 4,543,285 | A |   | 9/1985  | Thoese |
| 4,695,390 | A | * | 9/1987  | Koch et al. ................. 508/221 |
| 4,880,430 | A | * | 11/1989 | Schleusener ................... 8/188 |
| 5,221,491 | A |   | 6/1993  | Stover et al. |
| 5,269,952 | A |   | 12/1993 | Proffitt, Jr. |
| 6,056,967 | A | * | 5/2000  | Steuerle et al. ............. 424/401 |
| 6,579,846 | B1| * | 6/2003  | Zirnstein et al. ............ 510/499 |
| 6,908,490 | B2| * | 6/2005  | Boeckh et al. ................. 8/181 |

FOREIGN PATENT DOCUMENTS

| WO | 90 10747 | 9/1990 |
| WO | 94 00418 | 1/1994 |
| WO | 97 00351 | 1/1997 |
| WO | 98 27263 | 6/1998 |

* cited by examiner

*Primary Examiner*—H. Thi Le
(74) *Attorney, Agent, or Firm*—Oblon, Spivak, McClelland, Maier & Neustadt, P.C.

(57) ABSTRACT

The present invention relates to a particulate, linear, sheet-like or three-dimensional structure comprising, at least on its surface, a hydrophilicizing amount of at least one acylated polyamine, where at least some of the polyamine nitrogen atoms bear acyl radicals of the formula I $$R^1\text{—CO—} \qquad (I)$$

where $R^1$ is hydrogen, $C_1$–$C_{27}$-alkyl, $C_7$–$C_{27}$-alkenyl or $C_6$–$C_{10}$-aryl, and where the alkyl, alkenyl and aryl groups may bear at least one substituent selected from the class consisting of hydroxyl, alkoxy, alkoxycarbonyl and $NE^1E^2$, where $E^1$ and $E^2$ may be identical or different and are hydrogen, alkyl or acyl, to the use of acylated polyamines for modifying the surface properties of solids, and also to a process for modifying the surface properties of particulate, linear, sheet-like, or three-dimensional structures.

19 Claims, No Drawings

USE OF ACYLATED POLYAMINES FOR THE MODIFICATION OF SURFACES

The present invention relates to the modification of surface properties of particulate, linear, sheet-like or three dimensional structures.

Articles made from synthetic materials, such as thermosets or thermoplastics, generally have hydrophobic surface properties. However, hydrophobic surface properties are frequently undesirable if adhesive, or a coating or ink or paint or lacquer, is to be applied to the article, since most adhesives, coating compositions, and paints give only inadequate adhesion to hydrophobic surfaces. Hydrophobic properties are also undesirable in textile sheets, in particular in nonwovens. Examples of uses of nonwovens are cloths for cleaning, wiping or dishwashing, and serviettes. In these applications it is important that when spilled liquids, for example, such as milk, coffee, etc. are wiped up they are rapidly and fully absorbed, and that wet surfaces are dried as fully as possible. The absorption of liquids by a cleaning cloth becomes more rapid as their transport on the fiber surface becomes faster, and fibers with a hydrophilic surface are readily and rapidly wetted by aqueous liquids.

There are various conventional processes for hydrophilicizing the surfaces of films or moldings. For example, the surfaces of plastic items can be activated by gaseous fluorine. However, this process requires operations using the highly poisonous gas fluorine, with increased apparatus costs. Corona and plasma treatments are other processes used to increase the hydrophilic character of the surface of various materials, such as plastics or metals.

To improve the water-absorption properties of nonwovens, use is also made of surface-active hydrophilicizing agents, such as emulsifiers, surfactants, or wetting agents. These give excellent initial hydrophilic properties. However, a disadvantage of these nonwovens is that the hydrophilic agents are gradually washed out by water or other aqueous media.

After repeated contact with water, the product becomes increasingly hydrophobic. Another disadvantage of the known surface-active agents is a marked reduction in the surface tension of water so that in many applications, in particular in nonwovens used for sanitary or diaper applications, there is an undesirable increase in the susceptibility to permeation and in the wetting power of the liquid absorbed.

WO 98/27263 discloses stably hydrophilic polymer coatings for fibers made from polyester or from polypropylene or the like. The coating comprises certain polyoxypropylamines or polypropylene oxide polymers or hydrophilic polyester copolymers containing ethylene terephthalate units.

WO 97/00351 describes durably hydrophilic polymer coatings for polyester fibers, polyethylene fibers, or polypropylene fibers, and for the corresponding woven fabrics. The coatings comprise hydrophilic copolyesters, and also polypropylene oxide polymers.

It is an object of the present invention to provide hydrophilic particulate, linear, sheet-like or three dimensional structures, and also a process for increasing the hydrophilic surface properties of structures of this type.

We have found that this object is achieved by means of a particulate particulate, linear, sheet-like or three-dimensional structure comprising, at least on its surface, a hydrophilicizing amount of at least one acylated polyamine, where some of the polyamine nitrogen atoms bear acyl radicals of the formula I $$R^1-CO- \tag{I}$$

where $R^1$ is hydrogen, $C_1$–$C_{27}$-alkyl, $C_7$–$C_{27}$-alkenyl or $C_6$–$C_{10}$-aryl, and where the alkyl, alkenyl and aryl groups may bear at least one substituent selected from the group consisting of hydroxyl, alkoxy, alkoxycarbonyl and $NE^1E^2$, where $E^1$ and $E^2$ may be identical or different and are hydrogen, alkyl or acyl.

Preferred embodiments of the structure of the invention are linear or sheet-like textile structures. Other preferred embodiments of the structure of the invention are plastic films and plastic moldings.

For the purposes of the present invention, particulate structures encompass the range from fine pigments to macroscopic particles. They particularly include those with a particle size of from 1 nm to 10 mm, in particular from 10 nm to 1 mm, which are preferably dispersed or dispersible in a medium. Examples which may be mentioned are pigments, mineral or metallic fillers, and nonliving organic materials.

For the purposes of the present invention, linear structures are particularly fibers, filaments, yarns, threads, and the like. Sheet-like structures are particularly wovens, knits, felts, webs, or nonwovens, preferably the latter. A nonwoven is produced by laying down a web of fibers which is then consolidated by various processes to give nonwovens. For example, the web is treated with an aqueous binder, such as a polymer latex, and then, where appropriate after removal of excess binder, dried and, where appropriate, cured. Other sheet-like structures are films, paper, and comparable two-dimensional structures.

For the purposes of the present application, linear textile structures also include textile composites, e.g. carpets, backed textiles, laminated textiles, etc.

Three-dimensional structures are generally moldings of various dimensions. They include in particular moldings made from wood, from paper, from metals, from plastics, from ceramic substrates, and from woven fabrics composed of natural or synthetic fibers in the form of fluffs, tissues, etc.

Preferred embodiments of the structure of the invention are linear or sheet-like textile structures. Other preferred embodiments of the structure of the invention are plastic films and plastic moldings.

The structures used according to the invention preferably encompass at least one natural or synthetic polymeric material.

Examples of materials of this type are:
1. Polymers of mono- and diolefins, for example polypropylene, polyisobutylene, poly-1-butene, poly-4-methyl-1-pentene, polyisoprene, and polybutadiene, and also polymers of cycloolefins, e.g. of cyclopentene or norbornene; also polyethylene (which may, where appropriate, have been crosslinked), e.g. high-density polyethylene (HDPE), high-density high-molecular-weight polyethylene (HDPE-HMW), high-density ultra high-molecular-weight polyethylene (HDPE-UHMW), medium-density polyethylene (MDPE), low-density polyethylene (LDPE), linear low-density polyethylene (LLDPE), and branched low-density polyethylene (VLDPE). Polyolefins, i.e. the monoolefin polymers mentioned by way of example in the section above, in particular polyethylene and polypropylene, may be prepared by various processes, in particular free-radical processes, or by way of a catalyst, the catalyst usually comprising one or more metals of group IVb, Vb, VIb, or VIII. These catalyst systems are usually termed Phillips, Standard Oil Indiana, Ziegler(-Natta), TNZ (Dupont), metallocene, or single-site catalysts (SSC).

2. Mixtures of the polymers mentioned in 1., e.g. mixtures of polypropylene with polyisobutylene, polypropylene with polyethylene (e.g. PP/HDPE, PP/LDPE), and mixtures of different polyethylene grades (e.g. LDPE/HDPE).

3. Copolymers of mono- and diolefins with one another or with other vinyl monomers, e.g. ethylene-propylene copolymers, linear low-density polyethylene (LLDPE), and mixtures of the same with low-density polyethylene (LDPE), propylene-1-butene copolymers, propylene-isobutylene copolymers, ethylene-1-butene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers of these with carbon monoxide, and ethylene-acrylic acid copolymers and salts of these (ionomers), and also terpolymers of ethylene with propylene and with a diene, such as hexadiene, dicyclopentadiene, or ethylidenenorbornene; also mixtures of these copolymers with one another, or with polymers mentioned in 1., e.g. polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers, and alternating-structure or random-structure polyalkylene-carbon monoxide copolymers, and mixtures of these with other polymers, e.g. with polyamides.

4. Hydrocarbon resins, including hydrogenated modifications of these (e.g. tackifier resins), and mixtures of polyalkylenes and starch.

5. Polystyrene, poly(p-methylstyrene), poly(α-methylstyrene).

6. Copolymers of styrene or α-methylstyrene with dienes or with acrylic derivatives, e.g. styrene-butadiene, styrene-acrylonitrile, styrene-alkyl methacrylate, styrene-butadiene-alkyl acrylate, styrene-butadiene-alkyl methacrylate, styrene-maleic anhydride, styrene-acrylonitrile-methyl acrylate; mixtures with high impact strength made from styrene copolymers with another polymer, e.g. with a polyacrylate, with a diene polymer, or with an ethylene-propylene-diene terpolymer; and block copolymers of styrene, e.g. styrene-butadiene-styrene, styrene-isoprene-styrene, styrene-ethylene/butylene-styrene, and styrene-ethylene/propylene-styrene.

7. Graft copolymers of styrene or α-methylstyrene, e.g. styrene on polybutadiene, styrene on polybutadiene-styrene copolymers, styrene on polybutadiene-acrylonitrile copolymers, styrene and acrylonitrile (and, respectively, methacrylonitrile) on polybutadiene; styrene, acrylonitrile, and methyl methacrylate on polybutadiene; styrene and maleic anhydride on polybutadiene; styrene, acrylonitrile, and maleic anhydride or maleimide on polybutadiene; styrene and maleimide on polybutadiene, styrene and alkyl acrylates and, respectively, alkyl methacrylates on polybutadiene, styrene and acrylonitrile on ethylene-propylene-diene terpolymers, styrene and acrylonitrile on polyalkyl acrylates or on polyalkyl methacrylates, styrene and acrylonitrile on acrylate-butadiene copolymers, and also mixtures of these with the copolymers mentioned in 6., e.g. those known as ABS polymers, MBS polymers, ASA polymers, or AES polymers.

8. Halogen-containing polymers, e.g. polychloroprene, chlorinated rubber, chlorinated and brominated isobutylene-isoprene copolymer (halobutyl rubber), chlorinated or chlorosulfonated polyethylene, copolymers of ethylene with chlorinated ethylene, epichlorohydrin homo- and copolymers, and in particular polymers of halogen-containing vinyl compounds, e.g. polyvinyl chloride, polyvinylidene chloride, polyvinyl fluoride, polyvinylidene fluoride; and copolymers of these, such as vinyl chloride-vinylidene chloride, vinyl chloride-vinyl acetate, and vinylidene chloride-vinyl acetate.

9. Polymers derived from α,β unsaturated acids or from derivatives of these, for example polyacrylates and polymethacrylates, butyl-acrylate-impact-modified polymethyl methacrylates, polyacrylamides, and polyacrylonitriles.

10. Copolymers of the monomers mentioned in 9. with one another or with other unsaturated monomers, e.g. acrylonitrile-butadiene copolymers, acrylonitrile-alkyl acrylate copolymers, acrylonitrile-alkoxyalkyl acrylate copolymers, acrylonitrile-vinyl halide copolymers, and acrylonitrile-alkyl methacrylate-butadiene terpolymers.

11. Polymers derived from unsaturated alcohols or amines and, respectively, their acyl derivatives or acetals, for example polyvinyl alcohol, polyvinyl acetate, polyvinyl stearat, polyvinyl benzoate, polyvinyl maleate, polyvinyl butyral, polyallyl phthalate, polyallylmelamine; and copolymers of these with olefins mentioned in 1.

12. Homo- and copolymers of cyclic ethers, for example polyalkylene glycols, polyethylene oxide, polypropylene oxide, and copolymers of these with bisglycidyl ethers.

13. Polyacetals, such as polyoxymethylene, and polyoxymethylenes which contain comonomers, e.g. ethylene oxide; polyacetals modified with thermoplastic polyurethanes, with acrylates, or with MBS.

14. Polyphenylene oxides and polyphenylene sulfides, and mixtures of these with styrene polymers or with polyamides.

15. Polyurethanes derived, on the one hand, from polyethers, polyesters, or polybutadienes having terminal hydroxyl groups and, on the other hand, from aliphatic or aromatic polyisocyanates, and also precursors of these polyurethanes.

16. Polyamides and copolyamides derived from diamines and dicarboxylic acids, and/or from aminocarboxylic acids, or from the corresponding lactams, for example nylon-4, nylon-6, nylon-6,6, -6,10, -6,9, -6,12, -4,6, -12,12, -11, and -12, aromatic polyamides, e.g. those based on p-phenylenediamine and adipic acid; polyamides prepared from hexamethylenediamine and iso- and/or terephthalic acid and, where appropriate, an elastomer as modifier, e.g. poly-2,4,4-trimethylhexamethyleneterephthalamide or poly-m-phenyleneisophthalamide. Other suitable polymers are block copolymers of the abovementioned polyamides with polyolefins, with olefin copolymers, with inomers, or with chemically bonded or grafted elastomers; or with polyethers, e.g. with polyethylene glycol, polypropylene glycol, or polytetramethylene glycol. EPDM- or ABS-modified polyamides or copolyamides are also suitable, as are polyamides condensed during processing ("RIM polyamide systems").

17. Polyureas, polyimides, polyamide imides, polyetherimides, polyesterimides, polyhydantoins, and polybenzimidazoles.

18. Polyesters which derive from dicarboxylic acids and dialcohols and/or from hydroxycarboxylic acids, or from the corresponding lactones, for example polyethylene terephthalate, polybutylene terephthalate, poly-1,4-dimethylolcyclohexane terephthalate, polyhydroxybenzoates, and also block polyetheresters which derive from polyethers having hydroxyl end groups; said polyesters modified with polycarbonates or with MBS.
19. Polycarbonates and polyester carbonates.
20. Polysulfones, polyether sulfones, and polyether ketones.
21. Crosslinked polymers which derive from aldehydes on the one hand and from phenols, urea or melamine on the other, for example phenol-formaldehyde resins, urea-formaldehyde resins, and melamine-formaldehyde resins.
22. Drying and nondrying alkyd resins.
23. Unsaturated polyester resins which derive from copolyesters of saturated or unsaturated dicarboxylic acids with polyhydric alcohols, and also vinyl compounds as crosslinkers, and also halogen-containing, flame-retardant modifications of these.
24. Crosslinkable acrylic resins which derive from substituted acrylic esters, e.g. from epoxyacrylates, from urethane acrylates, or from polyester acrylates.
25. Alkyd resins, polyester resins, and acrylate resins which have been crosslinked by melamine resins, by urea resins, by isocyanates, by isocyanurates, with polyisocyanates, or by epoxy resins.
26. Crosslinked epoxy resins which derive from aliphatic, cycloaliphatic, heterocyclic, or aromatic glycidyl compounds, e.g. products of bisphenol A diglycidyl ethers or of bisphenol F diglycidyl ethers, which are crosslinked by way of conventional hardeners, e.g. anhydrides or amines, with or without accelerators.
27. Natural polymers, such as cellulose, natural rubber, gelatine, and also their polymer-homologous chemically modified derivatives, for example cellulose acetates, cellulose propionates, and cellulose butyrates and the cellulose ethers, such as methylcellulose; and colophony resins and derivatives.
28. Binary or multiple mixtures (polymer blends) of the abovementioned polymers are also very generally suitable, e.g. PP/EPDM, nylon/EPDM or ABS, PVC/EVA, PVC/ABS, PVC/MBS, PC/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/nylon-6,6 and copolymers, PA/HDPE, PA/PP, PA/PPO, PBT/PC/ABS, and PBT/PET/PC.

Preference is given to those particulate, linear, sheet-like or three dimensional structures which encompass at least one polymeric material selected from the group consisting of polyolefins, polyesters, polyamides, polyacrylonitrile, polyaromatics, styrene-acrylonitrile copolymers (SAN), acrylonitrile-butadiene-styrene copolymers (ABS), polyurethanes, and mixtures (polymer blends) of the abovementioned polymers.

Preferred structures used according to the invention are synthetic fibers, particularly made from polyolefins, such as polyethylene or polypropylene, polyesters, polyacrylonitrile, or polyamides, e.g. nylon-6 or nylon-6,6.

Preferred structures used according to the invention are sheet-like structures, and in particular films or foils. These preferably encompass a polymer selected from the group consisting of polyolefins, such as polyethylene and/or polypropylene, polymers of halogenated monomers, e.g. polyvinyl chloride and/or polytetrafluoroethylene, polyesters and mixtures of these.

Another preferred structure used according to the invention is a molding. This preferably encompasses at least one polymeric material selected from the group consisting of polyolefins, e.g. polyethylene and/or polypropylene, polyaromatics, such as polystyrene, polymers of halogenated monomers, for example polyvinyl chloride and/or polytetrafluoroethylene, polyesters, polyacrylonitrile, styrene-acrylonitrile copolymers, acrylonitrile-butadiene-styrene copolymers, polyamides, such as nylon-6 and/or nylon-6,6, polyurethanes and mixtures of these.

According to the invention at least one acylated polyamine is used for surface-modification, specifically for hydrophilicization, where at least some of the polyamine nitrogen atoms bear acyl radicals of the formula I $$R^1-CO- \qquad (I)$$

where $R^1$ is hydrogen, $C_1$–$C_{27}$-alkyl, $C_7$–$C_{27}$-alkenyl or $C_6$–$C_{10}$-aryl, and where the alkyl, alkenyl and aryl groups may bear at least one substituent selected from the group consisting of hydroxyl, alkoxy, alkoxycarbonyl and $NE^1E^2$, where $E^1$ and $E^2$ may be identical or different and are hydrogen, alkyl or acyl.

For the purposes of the present invention, the expression $C_1$–$C_{27}$-alkyl encompasses straight-chain and branched alkyl groups. These include firstly relatively short-chain $C_1$–$C_6$-alkyl groups. Particularly preferred $C_1$–$C_6$-alkyl groups are methyl, ethyl, n-propyl, isopropyl, n-butyl, 1-methylpropyl, 2-methylpropyl, 1,1-dimethylethyl, n-pentyl, 1-methylbutyl, 2-methylbutyl, 3-methylbutyl, n-hexyl. Straight-chain or branched $C_1$–$C_3$-alkyl groups are preferred.

The groups also include relatively long-chain $C_7$–$C_{27}$-alkyl groups. The expression $C_7$–$C_{27}$-alkyl encompasses straight-chain and branched alkyl groups. These are preferably straight-chain or branched $C_9$–$C_{25}$-alkyl, particularly preferably $C_{10}$–$C_{22}$-alkyl, and specifically $C_{11}$–$C_{19}$-alkyl. These are preferably predominantly linear alkyl radicals, as also occur in natural or synthetic fatty acids and fatty alcohols, and also oxo alcohols. They include in particular n-octyl, ethylhexyl, 1,1,3,3-tetramethylbutyl, n-nonyl, n-decyl, n-undecyl, n-dodecyl, n-tridecyl, myristyl, pentadecyl, palmityl (=cetyl), heptadecyl, octadecyl, nonadecyl, arachidyl, behenyl, lignocerenyl, cerotinyl, melissinyl etc.

$C_7$–$C_{27}$-alkenyl is preferably straight-chain or branched alkenyl, which may be mono-, di- or polyunsaturated. It is preferably $C_9$–$C_{25}$-alkenyl, in particular $C_{10}$–$C_{22}$-alkenyl, and specifically $C_{11}$–$C_{19}$-alkenyl. These groups include in particular octenyl, nonenyl, decenyl, undecenyl, dodecenyl, tridecenyl, tetradecenyl, pentadecenyl, hexadecenyl, heptadecenyl, octadecenyl, nonadecenyl, linolyl, linolenyl, elaostearyl etc.

$R^1$ is preferably unsubstituted or has one, two, three, or four of the abovementioned substituents. The maximum achievable degree of substitution here is generally limited only by the chain length of $R^1$.

$R^1$ is preferably $C_1$–$C_{27}$-hydroxyalkyl or -alkenyl which has one, two, three, or four, preferably one or two, hydroxyl groups. $R^1$ is preferably hydroxyalkyl formally derived from a hydroxycarboxylic acid by removing the carboxylic acid group. Examples of preferred hydroxycarboxylic acids are $C_2$–$C_7$ monohydroxycarboxylic acids, e.g. glycolic acid, lactic acid, 4-hydroxybutyric acid, 5-hydroxypentanoic acid, 6-hydroxyhexanoic acid, and mixtures of these. Other suitable monohydroxycarboxylic acids are $C_8$–$C_{28}$ monohydroxycarboxylic acids, e.g. 10-hydroxydecanoic acid, 11-hydroxyundecanoic acid, 12-hydroxystearic acid, ricinoleic acid, and also hydroxy fatty acids, obtainable by hydrogenating epoxy fatty acids, for example. Examples of suitable $C_8$–$C_{28}$ dihydroxycarboxylic acids are also obtainable via hydrolytic ring-opening of epoxy fatty acids.

Another preferred meaning of $R^1$ is $C_1$–$C_{27}$-aminoalkyl or -alkenyl which may have one, two, three, or four, preferably one or two, amino groups. The nitrogen atoms of the amino groups may, where appropriate, have one or two substituents selected among alkyl or acyl. Preferred alkyl substituents of the amino groups are the abovementioned $C_1$–$C_6$-alkyl groups. Preferred acyl substituents of the amino groups are $C_1$–$C_6$-acyl, in particular formyl and acetyl. The nitrogen atoms of the amino groups preferably have no substituents.

$R^1$ is preferably an aminoalkyl or -alkenyl radical formally derived from a $C_1$–$C_{27}$ monoaminocarboxylic acid by removing the carboxylic acid groups. These include in particular 2-aminocarboxylic acids, such as glycine, alanine, valine, lysine, 6-aminohexanoic acid, 11-aminoundecanoic acid, and mixtures of these.

$R^1$ is preferably $C_6$–$C_{10}$-aryl which may have one, two, three, or four, preferably one or two, of the abovementioned substituents. $R^1$ is preferably a $C_6$–$C_{10}$-aryl radical formally derived from an aromatic carboxylic acid, hydroxycarboxylic acid, or aminocarboxylic acid, by removing the carboxylic acid group. These preferably include benzoic acid, 2-hydroxybenzoic acid, 3-hydroxybenzoic acid, 4-hydroxybenzoic acid, 2-aminobenzoic acid, 3-aminobenzoic acid, 4-aminobenzoic acid, 1-naphthalenecarboxylic acid, 2-naphthalenecarboxylic acid, 1-hydroxy-2-naphthoic acid, 2-hydroxy-1-naphthoic acid, 2-hydroxy-3-naphthoic acid, 6-hydroxy-2-naphthoic acid, 3-amino-1-naphthoic acid, 4-amino-1-naphthoic acid, 8-amino-1-naphthoic acid, and mixtures of these. The abovementioned aromatic hydroxy- and/or aminocarboxylic acids may also have been alkylated or acylated on the hydroxyl and/or amino groups. $C_1$–$C_6$-alkyl and acyl are preferred.

It is preferable for from 5 to 100%, particularly preferably from 15 to 90%, in particular from 30 to 85%, of the polyamine nitrogen atoms to have an acyl radical of the formula I. These percentages are based on the total number of nitrogen atoms in the polyamine, i.e. on the total of primary, secondary and, if present, tertiary amine nitrogen atoms.

The proportion by weight of the radicals $R^1$ is preferably not more than 75% by weight, particularly preferably not more than 60% by weight, in particular not more than 40% by weight, based on the overall average molecular weight of the acylated polymeric polyamines.

One preferred embodiment of the invention is given by structures as described above where some of the polyamine nitrogen atoms bear acyl radicals of the formula II $$R^2\text{—CO—} \tag{II}$$

where $R^2$ is $C_7$–$C_{27}$-alkyl or $C_7$–$C_{27}$-alkenyl, and where the alkyl and alkenyl groups may bear at least one substituent selected from the group consisting of hydroxyl, alkoxy, alkoxycarbonyl, and $NE^1E^2$, where $E^1$ and $E^2$ may be identical or different and are hydrogen, alkyl, or acyl, and some of the polyamine nitrogen atoms bear acyl radicals of the formula III $$R^3\text{—CO—} \tag{III}$$

where $R^3$ is hydrogen, $C_1$–$C_6$-alkyl, or $C_6$–$C_{10}$-aryl, and where the alkyl and aryl groups may bear at least one substituent selected from the group consisting of hydroxyl, alkoxy, alkoxycarbonyl, and $NE^3E^4$, where $E^3$ and $E^4$ may be identical or different and are hydrogen, alkyl or acyl.

Preferred radicals $R^2$ are the abovementioned, where appropriate substituted, $C_7$–$C_{27}$-alkyl or -alkenyl radicals $R^1$.

Preferred radicals $R^3$ are the abovementioned, where appropriate substituted $C_1$–$C_6$-alkyl and $C_6$–$C_{10}$-aryl radicals $R^1$.

$R^2$ is particularly preferably unsubstituted $C_7$–$C_{27}$-alkyl or -alkenyl.

$R^3$ is particularly preferably hydrogen, unsubstituted $C_1$–$C_6$-alkyl, or unsubstituted $C_6$–$C_{10}$-aryl.

The difference between the numbers of carbon atoms in $R^2$ and $R^3$ is preferably at least 4, in particular at least 6, and specifically at least 10.

It is preferable for from about 5 to 100%, with preference from 15 to 90%, in particular from 30 to 85%, specifically from 40 to 80%, of the polyamine nitrogen atoms to have been acylated. The degree of acylation here is based on the total of acryl radicals of the formulae II and III.

One way of obtaining the acylated polymeric polyamines of the invention having acyl radicals of the formulae II and III of the formula I is to react at least one polyamine, preferably at least one polyalkylene polyamine, in particular at least one polyethyleneimine, with at least one carboxylic acid of the formula $$R^1\text{—COOH}$$

or with a derivative thereof.

The acylated polymeric polyamines used according to the invention and having acyl radicals of the formulae II and III are obtainable by reacting at least one polyamine, preferably at least one polyalkylene polyamine, in particular at least one polyethyleneimine, with at least one carboxylic acid $R^2$—COOH or with a derivative thereof, and with at least one carboxylic acid $R^3$—COOH or with a derivative thereof.

To this end, a polymeric polyamine may be reacted with a) at least one carboxylic acid of the formula II.1

$$R^2\text{—COOH} \tag{II.1}$$

where $R^2$ is as defined above, or with an ester, anhydride or halide thereof, and b) at least one carboxylic acid of the formula III.1

$$R^3\text{—COOH} \tag{III.1}$$

where $R^3$ is as defined above, or with an ester, anhydride or halide thereof.

Suitable polymeric polyamines are linear or branched polymers, preferably branched polymers. These preferably have acylatable secondary amino groups in the polymer chain. These polymers may also have terminal primary amino groups and/or tertiary amino groups in the polymer chain.

In one suitable embodiment, the amidatable polyalkylene polyamines may have a structure which is strictly or substantively linear. These polymers in turn have exclusively or substantively primary and secondary amino groups. It is preferable to use branched polyalkylene polyamines. The polyamine nitrogen atoms then encompass not only primary and secondary amino groups but also tertiary amino groups. The latter are not accessible to amidation reactions. It is preferable to use a polyalkylene polyamine whose weight-average molecular weight is from about 500 to 1 000 000, preferably from about 1 000 to 800 000, more preferably from 1 500 to 200 000, in particular from 2 000 to 50 000. Examples of preferred polyalkylene polyamines are polyethyleneimines.

Suitable polyethyleneimines are obtainable by conventional processes known to the skilled worker, and are available in the market. Suitable polyethyleneimines are any of the polymers which are obtainable by cationically initiated polymerization of ethyleneimine (aziridine) and/or of N-substituted aziridines. These are preferably homopolymers of ethyleneimine. Examples of catalysts which may be used for the cationic polymerization of ethyleneimines are Brönsted acids, such as sulfuric acid, phosphoric acid, p-toluenesulfonic acid, and carboxylic acids, such as formic acid, acetic acid, or propionic acid, and Lewis acids, for example halides, e.g. zinc chloride or alkyl halides, such as methyl chloride, ethyl chloride, benzyl chloride, or ethylene chloride. Suitable polyethyleneimines may also be obtained by reacting ethylene chloride with ammonia or amines. Polymers of this type are commercially available products. The proportion of tertiary amino groups in the branched polyalkylene polyamines is from 0.5 to 40 mol %, for example, e.g. from about 10 to 35 mol %, based on the total amount of polyamine nitrogen atoms. When the polyalkylene polyamines are reacted with the abovementioned carboxylic acids, under some circumstances it is also possible for a considerable proportion of the polyamine nitrogen atoms to react to form a salt. On occasions salts are obtained, for example, in the reaction of tertiary amino groups with carboxylic acids. This does not generally impair the use of the polymeric polyamines of the invention as hydrophilicizing agents.

$R^2$ in formula II.1 is preferably one of the abovementioned $C_7$–$C_{27}$-alkyl radicals or alkenyl radicals.

The carboxylic acid of the formula II.1 is preferably one selected among capric acid, lauric acid, myristic acid, palmitic acid, stearic acid, isostearic acid, oleic acid, linoleic acid, arachidonic acid, erucic acid, behenic acid, and mixtures of these.

It is preferable to use a mixture made of naturally occurring carboxylic acids of the formula II.1, e.g. coconut oil, which essentially consists of comprises lauric and myristic acid, or tallow, which comprises mainly saturated and unsaturated $C_{14}$-, $C_{16}$- and $C_{18}$ carboxylic acids, soya bean oil, linseed oil, rapeseed oil, fish oil, etc. The long-chain carboxylic acids are preferably $C_{12}$–$C_{18}$ carboxylic acids or mixtures of these.

If use is made of mixtures of long-chain carboxylic acids, these may comprise, for example, from about 0 to 10% by weight of short-chain carboxylic acids. In particular carboxylic acid mixtures from natural sources comprise on occasions a proportion of short-chain carboxylic acids.

The carboxylic acid of the formula III.1 is preferably formic acid, acetic acid, propionic acid, butyric acid, or a mixture of these. The carboxylic acid of the formula III.1 is particularly formic acid and/or acetic acid.

The acylated polymeric polyamines used according to the invention are preferably prepared by methods known per se, for example by reacting the abovementioned polyalkylene polyamines with at least one long-chain carboxylic acid or with a derivative thereof, and with at least one short-chain carboxylic acid or with a derivative thereof (amidation).

The polyamine may, if desired, first be reacted with the long-chain carboxylic acid(s) and then with the short-chain carboxylic acid(s), or first with the short-chain carboxylic acid(s), or simultaneously with a mixture of these. It is preferable for the polyamine to be reacted in a first reaction step with at least one long-chain carboxylic acid, and then in a second reaction step with at least one short-chain carboxylic acid. The molar ratio in which the starting materials are present in the first reaction step is such that, based on the total nitrogen content of the polyamine (including any tertiary amino groups present), from 0.3 to 40 mol %, preferably from 0.6 to 25 mol %, in particular from 1 to 15 mol %, of the polyamine nitrogen atoms are acylated and have an acyl radical of the formula II. The resultant, partially acylated polymeric polyamines may if desired prior to their further reaction be isolated by conventional processes and, where appropriate, be purified. It is preferable for the second step of the reaction to take place in the reaction used for the first step. In the second step of the reaction, the partially acylated polyamine and at least one short-chain carboxylic acid are used in a molar ratio such that, based on the total nitrogen content of the polyamine (including any tertiary amino groups present), from 5 to 100%, preferably from 15 to 90%, in particular from 30 to 85%, specifically from 40 to 80%, of the polyamine nitrogen atoms are acylated.

The amidation may be carried out under conventional conditions without adding a catalyst, or using an acidic or basic catalyst. Examples of suitable acidic catalysts are acids, for example Lewis acids, e.g. sulfuric acid, p-toluenesulfonic acid, phosphorous acid, hypophosphorous acid, phosphoric acid, methanesulfonic acid, boric acid, aluminum chloride, boron trifluoride, tetraethyl orthotitanate, tin dioxide, dibutyltin dilaurate, and mixtures of these. Examples of suitable basic catalysts are alkoxides, such as sodium methoxide or sodium ethoxide, alkali metal hydroxides, such as potassium hydroxide, sodium hydroxide, or lithium hydroxide, alkaline earth metal oxides, such as magnesium oxide or calcium oxide, alkali metal carbonates and alkaline earth metal carbonates, such as sodium carbonate, potassium carbonate, and calcium carbonate, phosphates, such as potassium phosphate, and complex metal hydrides, such as sodium borohydride.

The amount of any catalyst used concomitantly is generally from 0.05 to 10% by weight, preferably from 0.1 to 5% by weight, based on the total amount of the starting materials.

The reaction may be carried out in a suitable solvent, or preferably without any solvent. When a solvent is used, examples of those which are suitable are hydrocarbons, such as toluene or xylene, acetonitrile, N,N-dimethylformamide, N,N-dimethylacetamide, N-methylpyrrolidone, diethylene glycol dimethyl ether, ethylene glycol dimethyl ether, ethylene carbonate, propylene carbonate, etc. The solvent is generally distilled off during the reaction or after the reaction has ended. Where appropriate, this distillation may take place under an invert gas, such as nitrogen or argon.

When a carboxylic acid is used, the amidation generally takes place at a pressure in the range from 5 mbar to atmospheric pressure and at a temperature in the range from 60 to 220° C., preferably from 120 to 180° C. When a carboxylic ester is used, the amidation generally takes place at from 30 to 220° C., preferably at from 50 to 120° C., and at a pressure in the range 5 mbar to atmospheric pressure. The reaction times are generally in the range from 1 to 15 hours. The extent of the reaction can be followed via the amount of water of reaction and, respectively, alcohol of reaction removed. Once the reaction has ended, unconverted carboxylic acid is generally removed in the usual way, for example in vacuo, by extraction, or by stripping.

As an alternative, the acylated polymeric polyamines of the invention may also be obtained by reacting at least one polyamine with at least one suitable carboxylic acid derivative, for example with a carbonyl halide, e.g. with a carbonyl chloride, with a carboxylic anhydride, or with a mixed carboxylic anhydride.

This method gives products in which from about 10 to 100%, e.g. from about 20 to 95%, of the theoretically acylatable (i.e. the primary and secondary) amino groups have been acylated. The primary amino groups here are generally only monoacylated. The maximum practically achievable degree of acylation here may be equal to or below the theoretical maximum achievable degree of acylation. The maximum practically achievable degree of acylation is generally from about 70 to 100% of the maximum theoretically achievable degree of acylation. The products generally have very good hydrophilicizing properties, either at the maximum practically achievable degree of acylation or else below that level. One way of producing products having substantively the maximum practical degree of acylation is to use at least one of the carboxlic acids, preferably at least one short-chain carboxylic acid, in excess over the amidatable amino groups. Unconverted carboxylic acid may be removed as described above once the reaction has ended.

In one specific embodiment for preparing acylated polymeric polyamines, the polyamine may first be reacted with a long-chain carboxylic acid to give a partially acylated polyamine, and this may then be further reacted with a short-chain carboxylic acid, the molar ratio selected of short-chain carboxylic acid to acylatable amino groups of the partially acylated polyamine being such that the short-chain carboxylic acid is used in excess. Unconverted carboxylic acid is finally removed.

The process of the invention described above for preparing acylated polymeric polyamines gives products where the amino groups have been substantively acylated and not converted into salts. A small proportion of salt groups is not prejudicial to the use of the acylated polyamines as hydrophilicizing agents.

Acylated polymeric polyamines which can be used according to the invention may also be obtained by ring-opening polymerization of a monomer mixture which comprises at least one 4,5-dihydrooxazole and/or 5,6-dihydro-4H-1,3-oxazine, in each case having one of the radicals $R^2$ described above in the 2-position, and at least one 4,5-dihydrooxazole and/or 5,6-dihydro-4H-1,3-oxazine, in each case having one of the radicals $R^3$ described above in the 2-position.

The ring-opening polymerization of 4,5-dihydrooxazoles and/or 5,6-dihydro-4H-1,3-oxazines substituted in the 2-position gives strictly linear polyamines. The amounts used of the monomers are such that from about 0.3 to 40%, preferably from 0.6 to 25%, in particular from 1 to 15%, of the polyamine nitrogen atoms have an acyl radical of the formula I. If use is made exclusively of 4,5-dihydrooxazoles and, respectively, 5,6-dihydro-4H-1,3-oxazines substituted in the 2-position by radicals $R^2$ and $R^3$, the resultant polymeric polyamines have complete acylation. If desired, these may then be subjected to partial hydrolysis by known methods. In this way, it is also possible in preparing the polyamines of the invention by cationic polymerization to obtain products where from 5 to 100%, preferably from 15 to 90%, in particular from 30 to 85%, of the polyamine nitrogen atoms have been acylated.

The processes used for cationic ring-opening polymerization to prepare the acylated polymeric polyamines used according to the invention are conventional and known to the skilled worker.

Examples of suitable initiators for the cationic polymerization are Brönsted acids, such as perchloric acid and trifluoromethanesulfonic acid, Lewis acids, such as boron trifluoride, aluminum trifluoride, where appropriate with added water or hydrogen fluoride, and combinations of alkyl and aralkyl halides with Lewis acids.

The invention also provides the use of acylated polyamines, where at least some of the polyamine nitrogen atoms bear acyl radicals of the formula I $$R^1\text{—CO—} \tag{I}$$

where $R^1$ is hydrogen, $C_1$–$C_{27}$-alkyl, $C_7$–$C_{27}$-alkenyl or $C_6$–$C_{10}$-aryl, and where the alkyl, alkenyl and aryl groups may bear at least one substituent selected from the group consisting of hydroxyl, alkoxy, alkoxycarbonyl and $NE^1E^2$, where $E^1$ and $E^2$ may be identical or different and are hydrogen, alkyl or acyl, for modifying the surface properties of solids.

The invention also provides a process for modifying the surface properties of particulate, linear, sheet-like or three dimensional structures, in which an effective amount of an acylated polymeric polyamine is applied to the surface of the structures, where at least some of the polyamine nitrogen atoms bear acyl radicals of the formula I $$R^1\text{—CO—} \tag{I}$$

where $R^1$ is hydrogen, $C_1$–$C_{27}$-alkyl, $C_7$–$C_{27}$-alkenyl or $C_6$–$C_{10}$-aryl, and where the alkyl, alkenyl and aryl groups may bear at least one substituent selected from the group consisting of hydroxyl, alkoxy, alkoxycarbonyl and $NE^1E^2$, where $E^1$ and $E^2$ may be identical or different and are hydrogen, alkyl or acyl.

The invention also provides a process for modifying the surface properties of particulate, linear, sheet-like or three dimensional structures, in which the material of which the structure is composed is modified with an effective amount of an acylated polymeric polyamine, where at least some of the polyamine nitrogen atoms bear acyl radicals of the formula I $$R^1\text{—CO—} \tag{I}$$

where $R^1$ is hydrogen, $C_1$–$C_{27}$-alkyl, $C_7$–$C_{27}$-alkenyl or $C_6$–$C_{10}$-aryl, and used to produce the structure.

The polymers may be used in mixtures or in combination with surface-active substances, e.g. anionic, nonionic, or cationic surfactants or, respectively, wetting agents. They may also be used in a mixture with other polymers, and in some circumstances this can also achieve an increase in the surface-modifying effect.

The acylated polymeric polyamines used according to the invention are advantageously suitable for modifying the surface properties of particulate, linear, sheet-like or three dimensional structures. For the purposes of the present invention, the expression "modifying the surface properties" is interpreted widely. This includes especially hydrophilicization, which for the purposes of the present invention is generally an increase in the wettability with water or with an aqueous liquid. Increased wettability is usually attended by more rapid and/or increased absorption of liquid and/or by improved retention of liquid, generally also under superatmospheric pressure. However, according to the invention "modifying of surfaces" also includes an improvement in adhesion, an improved antistatic effect, an anti-deposition effect, improved properties for the wearer, e.g. in the case of sanitary products, and/or improved hand.

The structures of the invention are generally advantageously suitable for any application sector where water or aqueous liquids come into contact with materials which in their unmodified state are substantively hydrophobic. Particularly relevant factors here are the rapid absorption and/or the rapid transport of water into materials which are in themselves hydrophobic. The structures of the invention may moreover generally be used advantageously wherever modifying surfaces by hydrophilicization can achieve improved adhesion properties, improved antistatic properties, improved anti-deposition properties, improved hand and/or improved wearer comfort.

The structures of the invention are advantageously suitable in or as synthetic fibers, wovens, knits, nonwovens, felts, textile composites, e.g. carpets, backed or laminated textiles, etc. They are also advantageously suitable for use in diapers, sanitary pads, cloths for cleaning, wiping or dishwashing, and serviettes, agricultural textiles, geotextiles, and also for filter applications.

The acylated polyamines are suitable as hydrophilicizing agents for the abovementioned materials, in particular for synthetic fibers, for example those made from polyethylene, polypropylene, polyesters, polyacrylonitrile, or from polyamides. The acylated polyamines are also suitable for improving the printability and adhesive bondability of sheeting or films, for example those made from polyethylene, polypropylene, polyvinyl chloride, polytetrafluoroethylene, or from polyesters.

The antistatic properties of sheeting or films can also be improved by using acylated polyamines.

The use of acylated polyamines in association with moldings also gives an improvement in surface properties, making these more printable or more adhesive-bondable and giving them better antistatic properties. Examples of typical moldings are those made from polyethylene, polypropylene, polystyrene, polyvinyl chloride, polytetrafluoroethylene, polyesters, polyacrylonitrile, styrene-acrylonitrile copolymers (SAN), acrylonitrile-butadiene-styrene terpolymers (ABS), polyamides, such as nylon-6 or nylon-6,6, or from polyurethanes and/or mixtures of the abovementioned plastics.

The use of acylated polyamines also leads to an improvement in the surface conductivity of hydrophobic, nonconducting materials, in particular of the abovementioned plastics, and thus improves their antistatic properties. The acylated polyamines are also suitable for reducing the susceptibility of plastic films to deposition.

Another advantage of the agents of the invention compared with known hydrophilicizing agents is that they do not lead to any significant reduction in the surface tension of water.

The processes used to equip the particulate, linear, sheet-like or three dimensional structures of the invention with the acrylated polyamines may be those usually used to hydrophilicize the abovementioned structures with hydrophilicizing agents of the prior art. To this end, the structure is usually treated with a dilute, preferably aqueous solution of the acylated polyamine in a manner usual for the nature of the structure, e.g. by rinsing, dipping, spraying, padding, or similar methods as usually used for treating textiles or films. The content of acylated polyamines in the solution is generally in the range from at least 0.01 to 20% by weight, and preferably from 0.1 to 10% by weight, based on the weight of the solution. It is preferable to use aqueous solutions of the acylated polyamines for the treatment. The required amount of acylated polyamines for hydrophilicization is absorbed by the surface and remains adhering thereto after drying. The amounts required to achieve effective hydrophilicization are reached automatically and are extremely small. For structures with a smooth surface, such as films or similar structures, as little as 0.1 mg/m$^2$ of acylated polyamine is sufficient.

In another embodiment of the process of the invention for hydrophilicizing surfaces, the acylated polyamine may also be added to the material of which the structure is composed and the structure may then be produced from this. For example, when treating thermoplastics, the acylated polyamine in the form of a solid may be compounded with the plastic. The resultant treated plastic is then further processed by conventional processes to give films, for example by extrusion, or to give fiber materials, for example by a melt spinning processes.

The ease of use of the acylated polyamines used according to the invention permits their use in many application sectors, for example as hydrophilicizing agents for nonwovens used in diapers, hygiene inserts, agricultural textiles, geotextiles, other textiles, or filter systems, for example. The synthetic fibers treated with acylated polyamines may themselves be further processed to give fabrics or textiles. The result is an improvement in water-vapor permeability and capillary transport of perspiration, and a reduction in soiling by a wide variety of hydrophobic types of dirt. In addition, there is a favorable effect on soil release properties. The acylated polyamines may also be used as an antistatic treatment for plastic films or silicon wafers.

A suitable measure for assessing the hydrophilic/hydrophobic nature of the surface of a particulate, linear, sheet-like or three dimensional structure is the contact angle of water on the respective surface (see, for example, Römpp, Lexikon Chemie, 9th Edition, p. 372 "Benetzung", Georg Thieme Verlag (1995). The term hydrophobic surfaces is usually used here if the contact angle of water is above 90°. The use of acylated polymeric polyamines brings about a reduction in the contact angle by at least 5°, preferably by at least 10°, compared with that of the unmodified hydrophobic surface.

It is advantageous that the structures of the invention do not show the unfavorable effects known from the prior art on the surface tension of aqueous solutions, nor any increased susceptibility to migration.

The acylated polymeric polyamines used according to the invention, and also the structures surface-modified with the same, have particularly good compatibility with polymer melts. They are therefore generally also suitable as additives to a melt of polymeric raw materials for fibers or for moldings. However, the acylated polymeric polyamines may also be used as agents for modifying the structures by post-treatment.

The invention is further illustrated by the following non-limiting examples.

EXAMPLES

Test Method A: Angle of Contact Measurement

The substrate is treated, with stirring, with a 0.5% strength by weight solution of the additive for 30 min at 21° C. The specimen is divided up, and one half is dried immediately after treatment (CA1), while the other half is dipped in distilled water for about one second and then dried (CA2). The contact angle on both specimens is determined using distilled water at room temperature.

Test Method B: Measurement of Hydrophilic Properties

Substrate: polypropylene web

Treatment: the web is treated with a 0.5% strength by weight solution of the additive, and dried.

Test for hydrophilic properties: a drop of water is applied to the substrate to be tested. The wetting of the web by the water is assessed visually by way of a 10 point scale (no wetting 0 points, complete wetting with immediate run-out of the drop 10 points).

I Preparation Examples 399 g of polyethyleneimine with a number-average molecular weight ($M_w$) of about 25,000 were treated at 160° C. with 96.3 g of $C_{12}$–$C_{14}$ fatty acid (acid value (AV) 271 g KOH/g) (Edenor®) C 12 70, Henkel), and stirred for 6 hours at 160° C. under a stream of nitrogen. The water of reaction which forms was distilled off. This gives 480 g of a polyethyleneimine amidated to an extent of 5.0 mol % with $C_{12}$–$C_{14}$ fatty acid.

Example 2

140 g of the partially acylated polyethyleneimine from Example 1 were treated for 0.5 hours at 140° C. with 92.0 g of formic acid and stirred for a further 4.5 hours at 140° C. under a stream of nitrogen. The water of reaction which forms was distilled off. After completion of the amidation the mixture was cooled to 90° C. and 450 ml of demineralized water were added, with stirring. This gave 638 g of an approximately 30% strength aqueous solution of a polyethyleneimine amidated to an extent of 5.0 mol % with $C_{12}$–$C_{14}$ fatty acid and to the full remaining extent with formic acid.

Example 3

The water was removed at 120° C. and 25 mbar from 121 g of a 53% strength aqueous solution of a polyethyleneimine with a number-average molecular weight of about 5000. The polyethyleneimine, stirred under nitrogen, was treated at 80° C. with 15.5 g of $C_{12}$–$C_{14}$ fatty acid (AV 271 g KOH/g) (Edenor®) C 12 70, Henkel). Following heating, the mixture was stirred at 160° C. for 6 hours. The water of reaction which forms was distilled off. Following cooling of the mixture to 140° C., 51.8 g of formic acid were added dropwise and the mixture was stirred for a further 4.5 hours at 140° C. After amidation had been completed, the mixture was cooled to 90° C. and 230 ml of demineralized water were added, with stirring. This gave 332 g of a 31.5% strength aqueous solution of a polyethyleneimine amidated to an extent of 5.0 mol % with $C_{12}$–$C_{14}$ fatty acid and to the remaining extent with formic acid.

Example 4

The water was removed at 120° C. and 25 mbar from 123 g of a 56% strength aqueous solution of a polyethyleneimine with a number-average molecular weight of about 750,000. The polyethyleneimine, stirred under nitrogen, was treated at 80° C. with 16.6 g of $C_{12}$–$C_{14}$ fatty acid (AV 271 g KOH/g) (Edenor®) C 12 70, Henkel). Following heating, the mixture was stirred at 160° C. for 6 hours. The water of reaction which forms was distilled off. Following cooling of the mixture to 130–135° C., 55.2 g of formic acid were added dropwise and the mixture was stirred for a further 4.5 hours at 130–135° C. After amidation had been completed, the mixture was cooled to 90° C. and 540 ml of demineralized water were added, with stirring. This gave 651 g of a 17% strength aqueous solution of a polyethyleneimine amidated to an extent of 5.0 mol % with $C_{12}$–$C_{14}$ fatty acid and to the remaining extent with formic acid.

Example 5

67.8 g of a polyethyleneimine with a number-average molecular weight of about 1300 were treated at 80° C. with 20.7 g of $C_{12}$–$C_{14}$ fatty acid (AV 271 g KOH/g) (Edenor®) C 12 70, Henkel). Following heating, the mixture was stirred at 160° C. for 6 hours under a stream of nitrogen. The water of reaction which forms was distilled off. Following cooling of the mixture to 130–135° C., 46.0 g of formic acid were added dropwise and the mixture was stirred for a further 4.5 hours at 130–135° C. After amidation had been completed, the mixture was cooled to 90° C. and 230 ml of demineralized water were added, with stirring. This gave 333 g of a 31% strength aqueous solution of a polyethyleneimine amidated to an extent of 6.7 mol % with $C_{12}$–$C_{14}$ fatty acid and to the remaining extent with formic acid.

Example 6

140 g of a polyethyleneimine with a number-average molecular eight of about 25,000 were treated at 80° C. with 24.3 g of $C_{12}$–$C_{14}$ fatty acid (AV 271 g KOH/g) (Edenor®) C 12 70, Henkel). Following heating, the mixture was stirred at 160° C. for 6 hours under a stream of nitrogen. The water of reaction which forms was distilled off. Following cooling of the mixture to 140° C., 84.2 g of formic acid were added dropwise and the mixture was stirred for a further 4.5 hours at 140° C. After amidation had been completed, the mixture was cooled to 90° C. and 830 ml of demineralized water were added, with stirring. This gave 1034 g of a 20% strength aqueous solution of a polyethyleneimine amidated to an extent of 5 mol % with $C_{12}$–$C_{14}$ fatty acid and overall to an extent of about 65%.

Example 7

59.3 g of formic acid were slowly metered at 75° C., wih stirring, into 74.1 g of a polyethyleneimine with a number-average molecular weight ($M_w$) of about 25,000. During this process the temperature rose to 120° C. Following heating, the mixture was stirred for 4.5 hours at 130–140° C. under a stream of nitrogen. The water of reaction which forms was distilled off. After the amidation was complete, the mixture was cooled to 95° C., and 120 ml of demineralized water were added, with stirring. This gave 226 g of a 45% strength aqueous solution of a polyethyleneimine amidated to an extent of about 75 mol % with formic acid.

II. Performance-related Examples

Test Conditions

The specimens were prepared in 0.5% strength by weight solution in demineralized water, and the surface tension of the 0.5% strength solution was determined (Tensiometer from Lauda, ring method). The pH of the 0.5% strength solution was allowed to remain at the value which arose on preparation of the solution (cf. Table 2). The polypropylene film to be tested was treated with the solution for 30 min at room temperature and dried, and the contact angle with demineralized water was determined (Goniometer type contact angle measuring device from Kruss). The specimens were also assessed visually.

III. Performance-related Examples

III.1 Measurement of Contact Angle

The results are given in Table 1 below.

TABLE 1

| Example No. | Additive | Contact angle CA 1 |
|---|---|---|
| 8 (Comparison) | No additive | 105° |
| 9 (Comparison) | Commercially available alcohol ethoxylate | 58° |
| 10 (Comparison) | Commercially available hydrophilicizing polyetherester | 86° |
| 11 | Example 2 | 18° |
| 12 | Example 3 | 16° |
| 13 | Example 4 | 20° |
| 14 | Example 5 | 21° |
| 15 | Example 6 | 30° |
| 16 | Example 7 | 22° |

The CA 2 values for the polymers of the invention do not differ significantly from the CA 1 values. This shows that the hydrophilic effect continues after rinsing with water.

III.2: Measurement of Hydrophilic Properties

Hydrophilic properties were measured as described above. The results are given in Table 2 below.

TABLE 2

| Example No. | Additive | Hydrophilic properties |
|---|---|---|
| 17 (Comparison) | No additive | 0 |
| 18 (Comparison) | Commercially available hydrophilicizing polyetherester | 3 |
| 19 | Example 2 | 10 |
| 20 | Example 3 | 9 |
| 21 | Example 4 | 9 |
| 22 | Example 5 | 10 |
| 23 | Example 6 | 9 |
| 24 | Example 7 | 8 |

III.3: Determination of Affinity

Example 25

A 0.05% strength by weight solution of the acylated polyamine from Example 5 was adjusted to pH 7. A polypropylene-modified silicon wafer was then subjected to a perpendicular flow of the resultant solution at 0.7 ml/min, at room temperature. In comparison with a polymer-free solution, a change in the detection signal was observed due to absorption of the polymer. Using computer-assisted jet modeling, this change gives a coating weight of 0.9 mg/m$^2$. This coating weight shows no significant reduction if the surface is then subjected to a flow of polymer-free solution.

The performance-related examples show that polypropylene surfaces can be effectively hydrophilicized by the acylated polyamines used according to the invention. None of the examples of the invention here reveals any significant foaming tendency, whereas the commercially available alcohol ethoxylate used as comparative substance shows severe to very severe foaming tendency, as do the customary nonionic surfactants known from the prior art. In addition, when the acylated polyamines are used no significant reduction in surface tension of an aqueous solution is found, whereas the alcohol ethoxylate used as comparative substance markedly reduces surface tension, as do very generally the surfactants known from the prior art and used as hydrophilicizing agents.

We claim:

1. A process for providing a structure having a modified surface property; said process comprising:
applying an acylated polymeric polyamine to a surface of a structure to obtain said structure having a modified surface property,
wherein said modified surface property comprises a hydrophilic surface property, and
wherein from 5 to 100% of the nitrogen atoms comprised in said acylated polymeric polyamine, based on the total number of nitrogen atoms in said acylated polymeric polyamine, bear an acyl radical represented by formula I $$R^1-CO- \tag{I}$$

wherein $R^1$ is hydrogen, $C_1-C_{27}$-alkyl, $C_7-C_{27}$-alkenyl or $C_6-C_{10}$-aryl, wherein $C_1-C_{27}$-alkyl, $C_7-C_{27}$-alkenyl and $C_6-C_{10}$-aryl optionally comprise at least one substituent selected from the group consisting of hydroxyl, alkoxy, alkoxycarbonyl and $NE^1E^2$, wherein $E^1$ and $E^2$ are independently hydrogen, alkyl or acyl, and
the weight-average molecular weight of said acylated polymeric polyamine is from 1,000 to 1,000,000.

2. The process as claimed in claim 1, wherein said structure is a linear or sheet-like textile structure.

3. The process as claimed in claim 2, wherein said linear or sheet-like textile structure comprises synthetic fibers.

4. The process as claimed in claim 1, wherein said structure is a plastic film or a plastic molding.

5. The process as claimed in claim 1, wherein from 5 to 100% of the nitrogen atoms comprised in said acylated polymeric polyamine, based on the total number of nitrogen atoms in said acylated polymeric amine, bear an acyl radical represented by formula II $$R^2-CO- \tag{II}$$

and an acyl radical represented by formula (III)

$$R^3-CO- \tag{III}$$

wherein $R^2$ is $C_7-C_{27}$-alkyl or $C_7-C_{27}$-alkenyl, wherein said $C_7-C_{27}$-alkyl and $C_7-C_{27}$-alkenyl optionally comprise at least one substituent selected from the group consisting of hydroxyl, alkoxy, alkoxycarbonyl, and $NE^1E^2$,
and wherein $R^3$ is hydrogen, $C_1-C_6$-alkyl, or $C_6-C_{10}$-aryl, wherein $C_1-C_6$-alkyl and $C_6-C_{10}$-aryl optionally comprise at least one substituent selected from the group consisting of hydroxyl, alkoxy, alkoxycarbonyl, and $NE^3E^4$, wherein $E^3$ and $E^4$ are independently hydrogen, alkyl or acyl.

6. The process as claimed in claim 5, wherein the number of carbon atoms in $R^2$ and $R^3$ differs by at least 4.

7. The process as claimed in claim 5, wherein from 0.3 to 40 mol % of the nitrogen atoms comprised in said acylated polymeric polyamine have an acyl radical of the formula II.

8. The process as claimed in claim 1, wherein said structure is a particulate structure, a linear structure, a sheet-like structure, or a three-dimensional structure.

9. A process for providing a structure having a modified surface property; said process comprising:
adding an acylated polymeric polyamine to a material to obtain a modified material; and providing a structure which comprises said modified material to obtain said structure having a modified surface property, wherein said modified surface property comprises a hydrophilic surface property, and wherein from 5 to 100% of the nitrogen atoms comprised in said acylated polymeric polyamine, based on the total number of nitrogen atoms in said acylated polymeric polyamine, bear an acyl radical represented by formula I $$R^1\text{—CO—} \qquad (I)$$

wherein $R^1$ is hydrogen, $C_1$–$C_{27}$-alkyl, $C_7$–$C_{27}$-alkenyl or $C_6$–$C_{10}$-aryl, wherein said $C_1$–$C_{27}$-alkyl, $C_7$–$C_{27}$-alkenyl and $C_6$–$C_{10}$-aryl optionally comprise at least one substituent selected from the group consisting of hydroxyl, alkoxy, alkoxycarbonyl and $NE^1E^2$, wherein $E^1$ and $E^2$ are independently hydrogen, alkyl or acyl, and the weight-average molecular weight of said acylated polymeric polyamine is from 1,000 to 1,000,000.

10. The process as claimed in claim 9, wherein said structure is a particulate structure, a linear structure, a sheet-like structure, or a three-dimensional structure.

11. The process as claimed in claim 9, wherein said structure is a linear or sheet-like textile structure.

12. The process as claimed in claim 11, wherein said linear or sheet-like textile structure comprises synthetic fibers.

13. The process as claimed in claim 9, wherein said structure is a plastic film or a plastic molding.

14. The process as claimed in claim 9, wherein from 5 to 100% of the nitrogen atoms comprised in said acylated polymeric polyamine, based on the total number of nitrogen atoms in said acylated polymeric amine, bear an acyl radical represented by formula II $$R^2\text{—CO—} \qquad (II)$$

and an acyl radical represented by formula (III)

$$R^3\text{—CO—} \qquad (III)$$

wherein $R^2$ is $C_7$–$C_{27}$-alkyl or $C_7$–$C_{27}$-alkenyl, wherein said $C_7$–$C_{27}$-alkyl and $C_7$–$C_{27}$-alkenyl optionally comprise at least one substituent selected from the group consisting of hydroxyl, alkoxy, alkoxycarbonyl, and $NE^1E^2$, and wherein $R^3$ is hydrogen, $C_1$–$C_6$-alkyl, or $C_6$–$C_{10}$-aryl, wherein $C_1$–$C_6$-alkyl and $C_6$–$C_{10}$-aryl optionally comprise at least one substituent selected from the group consisting of hydroxyl, alkoxy, alkoxycarbonyl, and $NE^3E^4$, wherein $E^3$ and $E^4$ are independently hydrogen, alkyl or acyl.

15. The process as claimed in claim 14, wherein the number of carbon atoms in $R^2$ and $R^3$ differs by at least 4.

16. The process as claimed in claim 14, wherein from 0.3 to 40 mol % of the nitrogen atoms comprised in said acylated polymeric polyamine have an acyl radical of said formula II.

17. A structure comprising, at least on a surface of said structure, in an amount sufficient to render said surface of said structure hydrophilic, at least one acylated polymeric polyamine having a weight-average molecular weight of from 1,000 to 1,000,000, wherein from 5 to 100% of the nitrogen atoms comprised in said acylated polymeric polyamine, based on the total number of nitrogen atoms comprised in said acylated polymeric polyamine, bear an acyl radical represented by formula II $$R^2\text{—CO—} \qquad (II)$$

and represented by formula (III)

$$R^3\text{—CO—} \qquad (III)$$

wherein $R^2$ is $C_7$–$C_{27}$-alkyl or $C_7$–$C_{27}$-alkenyl, wherein said $C_7$–$C_{27}$-alkyl and $C_7$–$C_{27}$-alkenyl optionally comprise at least one substituent selected from the group consisting of hydroxyl, alkoxy, alkoxycarbonyl, and $NE^1E^2$, wherein $E^1$ and $E^2$ are independently hydrogen, alkyl, or acyl, and wherein $R^3$ is hydrogen, $C_1$–$C_6$-alkyl, or $C_6$–$C_{10}$-aryl, wherein said $C_1$–$C_6$-alkyl and $C_6$–$C_{10}$-aryl groups optionally comprise at least one substituent selected from the group consisting of hydroxyl, alkoxy, alkoxycarbonyl, and $NE^3E^4$, wherein $E^3$ and $E^4$ are independently hydrogen, alkyl or acyl, wherein said acylated polymeric amine is obtained by reacting a polymeric polyamine with a) at least one carboxylic acid represented by formula II.1

$$R^2\text{—COOH} \qquad (II.1)$$

wherein $R^2$ is $C_7$–$C_{27}$-alkyl or $C_7$–$C_{27}$-alkenyl, wherein said $C_7$–$C_{27}$-alkyl and $C_7$–$C_{27}$-alkenyl optionally comprise at least one substituent selected from the group consisting of hydroxyl, alkoxy, alkoxycarbonyl, and $NE^1E^2$, wherein $E^1$ and $E^2$ are independently hydrogen, alkyl, or acyl, and or with an ester, anhydride or halide thereof, wherein from 0.3 to 15 mol % of the nitrogen atoms comprised in said polymeric polyamine comprise the acyl radical represented by formula (II), and b) at least one carboxylic acid represented by formula III.1

$$R^3\text{—COOH} \qquad (III.1)$$

wherein $R^3$ is hydrogen, $C_1$–$C_6$-alkyl, or $C_6$–$C_{10}$-aryl, wherein said $C_1$–$C_6$-alkyl and $C_6$–$C_{10}$-aryl groups optionally comprise at least one substituent selected from the group consisting of hydroxyl, alkoxy, alkoxycarbonyl, and $NE^3E^4$, wherein $E^3$ and $E^4$ are independently hydrogen, alkyl or acyl, or with an ester, anhydride or halide thereof to obtain said acylated polymeric polyamine.

18. The process as claimed in claim 17, wherein said structure is a particular structure, a linear structure, a sheet-like structure, or a three-dimensional structure.

19. The structure as claimed in claim 17, wherein said acylated polymeric polyamine is obtained by reacting said polymer polyamine with said at least one carboxylic acid represented by formula II.1 to obtain a partially acylated polymeric polyamine, and then reacting said partially acylated polymeric polyamine with said at least one carboxylic acid represented by formula III.1 to obtain said acylated polymeric polyamine.

* * * * *